US009803981B2

(12) United States Patent
Schwartz et al.

(10) Patent No.: US 9,803,981 B2
(45) Date of Patent: Oct. 31, 2017

(54) OPTICAL PASSIVE RESONATOR GYRO WITH THREE BEAMS

(71) Applicant: THALES, Neuilly sur Seine (FR)

(72) Inventors: Sylvain Schwartz, Saint-Remy les Chevreuse (FR); Gilles Feugnet, Palaiseau (FR); Fabien Bretenaker, Velizy Villacoublay (FR)

(73) Assignee: Thales, Courbevoie (FR)

( * ) Notice: Subject to any disclaimer, the term of this patent is extended or adjusted under 35 U.S.C. 154(b) by 329 days.

(21) Appl. No.: 14/504,322

(22) Filed: Oct. 1, 2014

(65) Prior Publication Data
US 2015/0098089 A1   Apr. 9, 2015

(30) Foreign Application Priority Data
Oct. 4, 2013   (FR) ...................................... 13 02311

(51) Int. Cl.
*G01C 19/66* (2006.01)
*G01C 19/72* (2006.01)

(52) U.S. Cl.
CPC ......... *G01C 19/667* (2013.01); *G01C 19/726* (2013.01)

(58) Field of Classification Search
CPC .. G01C 19/721; G01C 19/722; G01C 19/723; G01C 19/726; G01C 19/727
See application file for complete search history.

(56) References Cited

U.S. PATENT DOCUMENTS

| 4,875,775 | A |   | 10/1989 | Michal et al. |
| 5,018,860 | A |   | 5/1991 | Bielas et al. |
| 5,031,988 | A |   | 7/1991 | Okada |
| 5,054,923 | A | * | 10/1991 | Okada ............ G01C 19/721 356/464 |

(Continued)

FOREIGN PATENT DOCUMENTS

| EP | 0427110 A1 | 5/1991 |
| EP | 1795865 A2 | 6/2007 |

(Continued)

OTHER PUBLICATIONS

Dreyer, R.W.P. et al. "Laser phase and frequency stabilization using an optical resonator". Applied Physics B, vol. 31, Issue 2, Jun. 1983, pp. 97-105.*

(Continued)

*Primary Examiner* — Michael A Lyons
(74) *Attorney, Agent, or Firm* — Davis Wright Tremaine LLP; Michael J. Donohue

(57) ABSTRACT

The general field of the invention is that of passive resonator gyros comprising an injection laser emitting an initial optical beam at a first frequency and a fiber optic cavity. The gyro according to the invention operates with three optical beams at three different optical frequencies. A first beam is injected in a first direction of rotation, the second and the third beam are injected in the contrary direction. The gyro includes three slaving devices maintaining each optical frequency at a specific mode of resonance of the cavity. The gyro includes means for measuring the frequency differences existing between the different frequencies. Combined together, these differences are representative of the length of the cavity and the angular rotational velocity of the cavity along an axis perpendicular to its plane.

20 Claims, 1 Drawing Sheet

(56) References Cited

U.S. PATENT DOCUMENTS

| | | | |
|---|---|---|---|
| 6,259,089 B1 | 7/2001 | Vali et al. | |
| 2007/0133003 A1 | 6/2007 | Sanders et al. | |
| 2011/0141477 A1 | 6/2011 | Sanders et al. | |
| 2011/0255094 A1 | 10/2011 | Mohageg et al. | |
| 2012/0057167 A1* | 3/2012 | Strandjord | G01C 19/723 356/461 |
| 2012/0307253 A1* | 12/2012 | Sanders | G01C 19/727 356/461 |
| 2014/0044142 A1* | 2/2014 | Strandjord | G01C 19/727 372/32 |
| 2014/0369699 A1* | 12/2014 | Strandjord | G01C 19/721 398/187 |

FOREIGN PATENT DOCUMENTS

| | | | |
|---|---|---|---|
| EP | 2246663 A2 | 3/2010 | |
| EP | 2333482 A2 | 6/2011 | |

OTHER PUBLICATIONS

French Search Report, dated Jun. 17, 2014, issued in French Application No. 1302311, filed Oct. 4, 2013, 10 pages.

\* cited by examiner

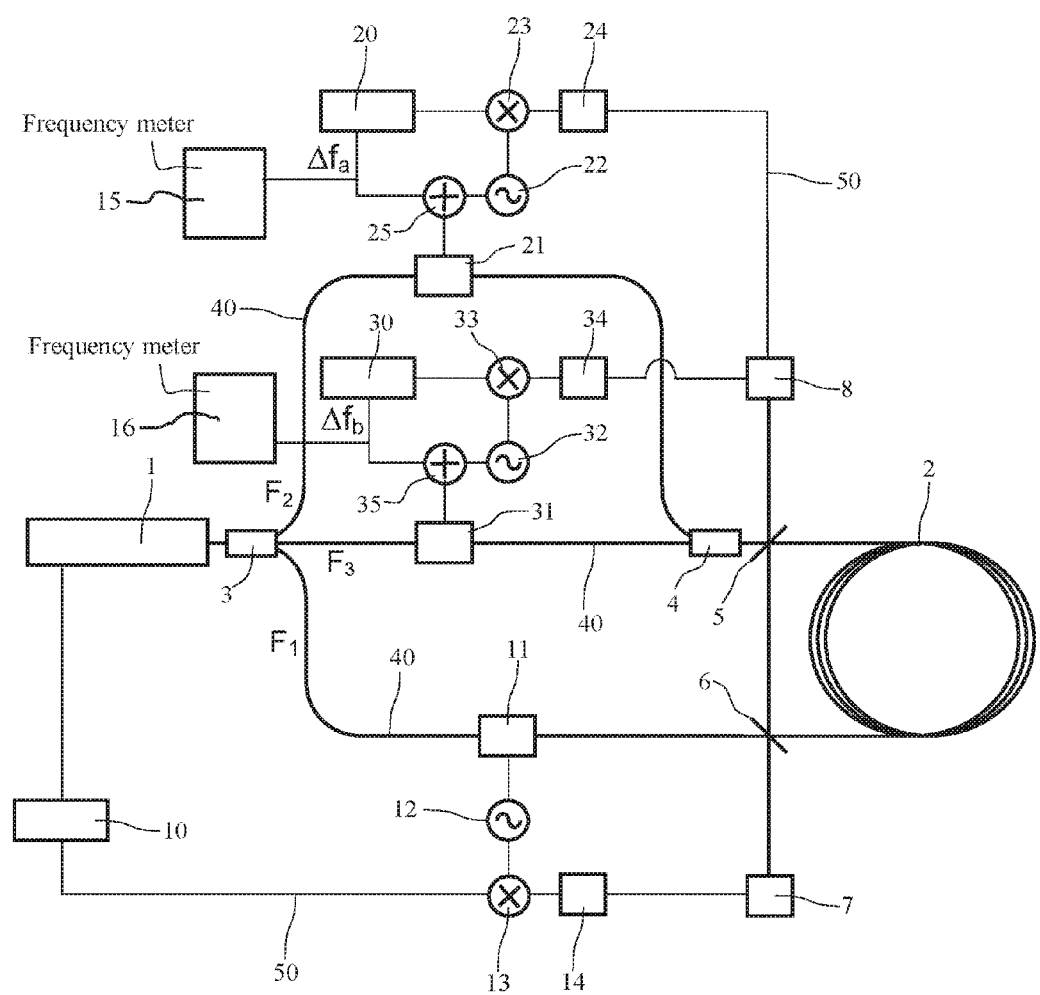

OPTICAL PASSIVE RESONATOR GYRO WITH THREE BEAMS

BACKGROUND OF THE INVENTION

1. Field of the Invention

The field of the invention is that of optical gyros, notably used in the field of inertial navigation in the context of embedded aeronautical applications. More precisely, the field of the invention is that of optical passive resonator gyros.

2. Description of the Related Art

Optical gyros are based on the principle of the measurement of the Sagnac effect. Under the effect of a rotation, the Sagnac effect induces a difference in traversal time between two electromagnetic signals propagating in opposite directions along a ring-shaped path. This difference in traversal time, proportional to the angular velocity of the device, can be measured either as a difference in phase in the context of an interferometer assembly or as a difference in proper frequency between the two counter-rotating modes of a ring-shaped cavity. In the first case, it is necessary to use an optical fibre to maximize the length of the interferometer and therefore the sensitivity of the device. The term interferometric fibre optic gyro, known by the acronym I-FOG, is then used. In the second case, the difference between the proper frequencies of the modes of the cavity can be measured in two ways. The first consists in using an active cavity, i.e. containing an amplifying medium, and in measuring the frequency difference between the counter-rotating modes emitted by the cavity. The term RLG, an acronym of Ring Laser Gyro, is then used. The second way consists in using a passive resonator cavity and in probing the proper frequencies of the counter-rotating modes using a laser. The term passive resonator gyro is then used.

The passive resonator gyro has a certain number of advantages compared to its rivals. Compared to the RLG, it notably circumvents the need to use a gaseous amplifying medium and the high-voltage electrode system that is usually associated with it. Compared to the I-FOG, it exhibits the advantage of a much shorter optical path which allows it to be less sensitive to the environment as well as more compact. Finally, it only involves standard components. Thus, the use of super-luminescent source is in particular avoided.

However, although these three types of gyros, I-FOG, RLG and passive resonator gyro, have all been demonstrated experimentally, to date, only the first two have resulted in industrial applications. The problem of backlighting, which creates coupling between counter-rotating modes and degrades the performance of the system, has been a brake on the development of the passive resonator gyro. Currently no completely satisfactory technical solution has been found to this problem. The noise resulting from the interference between the useful signal and the back-reflected signal can be partly filtered by a phase modulation technique. However, the latter in no way solves the problem of the coupling between counter-rotating modes, which creates a non-linearity in the frequency response and leads to a "blind spot" as on conventional ring laser gyros. Additionally, the problem of the stability of the scale factor is usually not dealt with in this type of gyro.

BRIEF SUMMARY OF THE INVENTION

The gyro according to the invention does not exhibit these drawbacks. It solves the problem of coupling between counter-rotating modes related to backlighting as well as that of the stability of the scale factor. The technical solution consists in using three separate frequencies that probe three separate modes of the cavity, instead of two modes in the solutions of the prior art.

This makes it possible on the one hand to circumvent the effect of the couplings because the modes are significantly separated in frequency, by at least one free spectral range, while having continuous access to the measurement of the rotation and the cavity length.

More precisely, the subject of the invention is a passive resonator gyro comprising at least one injection laser emitting an initial optical beam at a first frequency and a cavity, characterized in that the gyro includes:

- an optical splitter making it possible to divide the initial optical beam into a first optical beam, into a second optical beam and into a third optical beam, the first beam being injected into the cavity in a first direction, the second and the third optical beams being injected into the cavity in the opposite direction;
- a first slaving device making it possible to slave the first frequency of the first optical beam to a first proper frequency corresponding to a first mode of resonance of the cavity or to slave a first proper frequency corresponding to a first mode of resonance of the cavity to the first frequency of the first optical beam;
- a second slaving device making it possible to slave the second frequency of the second optical beam to a second proper frequency corresponding to a second mode of resonance of the cavity;
- a third slaving device making it possible to slave the third frequency of the third optical beam to a third proper frequency corresponding to a third mode of resonance of the cavity, the three proper frequencies being all different from each other;
- means for measuring a first frequency difference between the first frequency and the second frequency and for measuring a second difference between the second frequency and the third frequency, these two frequencies combined together being representative of the length of the cavity and the angular rotational velocity of the cavity along an axis perpendicular to the median plane of said cavity.

Advantageously, the gyro includes a first photodetector arranged so as to receive the first optical beam after crossing the cavity and a second photodetector arranged so as to receive the second optical beam and the third optical beam after crossing the cavity in the opposite direction, the first signal output by the first photodetector being sent in the first slaving device and the second signal output by the second photodetector being sent in the second slaving device and the third slaving device.

Advantageously, each slaving device includes at least:
- a phase shifting means arranged at the output of the first photodetector or of the second photodetector;
- an oscillator running at a predetermined oscillation frequency;
- a means for mixing the signals output by the oscillator and by the phase shifting means;
- a control loop delivering a frequency error signal based on the signal output by the mixing means;
- a means for summing the signal output by the control loop and by the oscillator.

Advantageously, the first slaving device includes a phase modulator having a predetermined modulation frequency and the second slaving device and the third slaving device each include an acousto-optical modulator making it possible to make frequency changes to the second frequency and the third frequency.

Advantageously, the second slaving device and the third slaving device each include a phase modulator making it possible to make frequency changes to the second frequency and the third frequency by serrodyne modulation.

Advantageously, the architecture of the first slaving device is of Pound Dreyer Hall type and the first slaving device, the second slaving device and the third slaving device include a control loop of PID type.

Advantageously, the cavity is partly or totally fibre optic, and its length is between a few tens of centimeters and a few meters. Advantageously, the cavity is a hollow-core photonic crystal fibre cavity.

Advantageously, the cavity is a device made with integrated optics. More precisely, the cavity is composed of an integrated optics waveguide.

Advantageously, when the angular rotational velocity of the gyro is zero, the first frequency, the second frequency and the third frequency are integer multiples of the base frequency equal to the speed of light divided by the length of the fibre optic cavity and the first frequency difference and the second frequency difference are at least equal to said base frequency.

BRIEF DESCRIPTION OF THE DRAWINGS

The invention will be better understood, and other advantages will become apparent, upon reading the following non-limiting description and using the appended FIGURE which represents an example of a block diagram of a gyro according to the invention.

DETAILED DESCRIPTION OF THE INVENTION

The passive resonator gyro according to the invention includes a ring-shaped cavity and a laser that is divided into three beams of different optical frequency. By way of example, the cavity can be composed of a hollow-core fibre to limit the Kerr effect. Each frequency is separated from the two other frequencies by a value corresponding to an integer multiple of the free spectral range of the cavity. The free spectral range FSR of the cavity conventionally has a value of:

$$FSR = c/L$$

c being the velocity of light and L the optical length of the ring-shaped cavity The first beam is slaved to a mode of the cavity in one direction of propagation and the two others are slaved to two other modes of the cavity corresponding to the opposite direction of propagation. It should be noted that it is also possible to produce the reverse slaving, i.e. to slave a first proper frequency corresponding to a first mode of resonance of the cavity to the first frequency of the first optical beam.

The difference in frequencies of the two beams propagating in the same direction gives access to the length of the cavity, whereas the difference in frequency between two counter-rotating beams gives access to the angular velocity of the assembly. The frequencies of the three beams are at all times sufficiently far apart for the effect of the inter-beam couplings to be rendered inoperative.

In the absence of rotation, each beam is slaved to a different proper frequency of the cavity that is denoted:

$f_1 = N_1 \cdot c/L$ for the first beam;

$f_2 = N_2 \cdot c/L$ for the second beam;

$f_3 = N_3 \cdot c/L$ for the third beam;

with $N_1$, $N_2$ and $N_3$ pair-wise distinct and known integers.

The frequencies must be close enough for the difference between the frequencies of each pair of beams to be compatible with the passband of a photodiode.

In the presence of a rotation, the proper frequencies are offset by a quantity $\Omega$ proportional to the angular velocity, which gives:

$f_1 = N_1 \cdot c/L + \Omega/2$ $f_2 = N_2 \cdot c/L - \Omega/2,$ $f_3 = N_3 \cdot c/L - \Omega/2$ The length of the cavity at any instant can now be known by measuring the frequency difference $\Delta f_{2-3}$ between the beams propagating in the same direction, i.e. in the example above:

$$L = \frac{(N_2 - N_3)}{\Delta f_{2-3}} \cdot c$$

The rotational velocity is deduced therefrom by measuring the frequency difference $\Delta f_{1-2}$ between two beams propagating in the opposite direction, i.e. in the example above:

$$\Omega = \Delta f_{1-2} - \Delta f_{2-3} \cdot \frac{(N_1 - N_2)}{(N_2 - N_3)}$$

By way of non-limiting example, the FIGURE represents an example of a block diagram of a gyro according to the invention. In FIGURE, the optical connections by fibre optics 40 are represented by bold lines and the electrical connections 50 by thinner lines. The gyro mainly includes:
- a laser source 1;
- a fibre optic laser cavity 2 of optical length L. The optical length L of the cavity corresponds to the sum of the ring-shaped fibre optic part and the part in free space defined by the mirrors 5 and 6. The fibre can be a hollow-core fibre. The cavity can also be a hollow-core photonic crystal fibre cavity. Note that the optical cavity could be produced with integrated optics;
- optical splitting and recombining means 3, 4, 5 and 6;
- two photodetectors 7 and 8;
- three slaving devices;
- frequency meter measuring means 15 and 16 in the FIGURE.

By way of example, the laser beam output by the laser source 1 crosses an optical coupler 3 which forms from this single beam three beams denoted F1, F2 and F3.

The first beam F1 is phase-modulated using a phase modulator denoted 11 controlled in the FIGURE by an oscillator 12 running at a predetermined oscillation frequency.

This beam F1 is injected into the cavity via the coupling mirror 6. The transmitted part of the beam is injected into the fibre optic part of the cavity 2 in the counter-clockwise or CCW direction. This transmitted part crosses the fibre optic part of the cavity and is then reflected by the coupling mirror 5, which makes it possible to seal the optical cavity. A part of the beam F1 is furthermore reflected towards the photodiode 7 at the moment of injection into the cavity.

The signal output by the photodiode 7 is demodulated with a phase adjustment produced by the phase shifter 14 so as to generate a dispersive signal cancelling itself when the optical frequency $f_1$ of the beam F1 is in resonance with a mode of the cavity, according to conventional methods of slaving at the peak of a resonance curve. The latter signal is mixed by a mixer 13 with that of the oscillator 12. If the frequency width of the cavity is not too small, typically above 1 MHz, the modulation frequency of this oscillator is chosen small by virtue of this width. If on the contrary the frequency width of the cavity is sufficiently small, typically below 1 MHz, the modulation frequency is chosen to be large by virtue of the cavity width. This is referred to as a Pound Dreyer Hall slaving architecture of the laser frequency. This technique is notably described in a publication by Dreyer, R. W. P. titled "Laser phase and frequency stabilization using an optical resonator" and published in Appl Phys B 31, 97-105 (1983).

The signal output by the oscillator is then sent into a control loop 10. This control loop 10 can, for example, be of PID type, an acronym meaning Proportional, Integral, Derivative, an allusion to the three modes of action on the error signal of the control loop. This type of slaving is well known in automatic control. This loop 10 acts on the laser 1 in feedback mode so as to maintain the beam F1 in resonance with the cavity mode. The frequency of the laser is then slaved to the following value, taking account where applicable of any rotation at the angular velocity Ω:

$$f_1 = N_1 \cdot c/L + \Omega/2 \quad N_1 \text{ being an integer;}$$

The second beam denoted F2 in the FIGURE passes through an acousto-optical modulator or AOM 21 intended to offset its frequency, and is then injected into the cavity via the optical coupler 4 and the coupling mirror 5. It is also possible to use a phase modulator making it possible to make frequency changes by serrodyne modulation.

The transmitted part of the beam is injected into the fibre optic part of the cavity 2 in the clockwise (CW) direction. This transmitted part crosses the fibre optic part of the cavity and is then reflected by the coupling mirror 6, which makes it possible to seal the optical cavity. One part of the beam F2 is furthermore reflected towards the photodiode 8 at the moment of injection into the cavity. The signal output by the photodiode 8 also passes through a phase shifter 24. The latter signal is mixed by the mixer 23 with that of the oscillator 22 and enters into the control loop 20. In the absence of rotation, the mean value of the frequency offset, denoted $\Delta f_a$ in the FIGURE, is chosen to be equal to the free spectral range of the cavity, which has a value of c/L. A modulation signal output by the oscillator 22 is likewise added to this mean value by the adder 25 intended to generate the signal making it possible to slave this mean value via this second control loop 20 so as to preserve the frequency f2 of the beam F2 in resonance with the mode of the cavity under consideration. The frequency $f_2$ is then slaved via $\Delta f_a$ to a proper frequency cavity mode. This frequency $f_2$ verifies, taking account where applicable of any rotation with the angular velocity Ω:

$$f_2 = (N_1+1)\cdot c/L - \Omega/2,$$

or else $$\Delta f_a = c/L - \Omega/2.$$

Similar circuitry to that used on the beam F2 is used to introduce into the cavity a third beam F3 also in the clockwise (CW) direction and slave its frequency $f_3$ of the beam F3 to the cavity mode corresponding to the proper frequency, verifying:

$$f_3 = (N_1-1)\cdot c/L - \Omega/2$$

The circuitry used on the path of the third beam F3 also employs a modulator 31, the coupler 4 and the coupling mirrors 5 and 6, the photodiode 8, an oscillator 32, mixer 33 and an adder 35, and a control loop 30. The third beam denoted F3 in the FIGURE passes through an acousto-optical modulator or AOM 31 intended to offset its frequency, and is then injected into the cavity via the optical coupler 4 and the coupling mirror 5. It is also possible to use a phase modulator making it possible to make frequency changes by serrodyne modulation.

The transmitted part of the beam is injected into the fibre optic part of the cavity 2 in the clockwise (CW) direction. This transmitted part crosses the fibre optic part of the cavity and is then reflected by the coupling mirror 6, which makes it possible to seal the optical cavity. One part of the beam F3 is furthermore reflected towards the photodiode 8 at the moment of injection into the cavity. The signal output by the photodiode 8 also passes through a phase shifter 34. The latter signal is mixed by the mixer 33 with that of the oscillator 32 and enters into a control loop 30. A modulation signal output by the oscillator 32 is likewise added to this mean value by the adder 35 intended to generate the signal making it possible to slave this mean value via the control loop 30 so as to preserve the frequency F3 of the beam F3 in resonance with the mode of the cavity under consideration. Thus, in the absence of rotation, the acousto-optical modulator 31 of the beam F3 offsets its frequency $f_3$ by the value −c/L. This offset becomes in the presence of a rotation at velocity Ω:

$$\Delta f_b = -c/L - \Omega/2.$$

Knowing the value of the offsets $\Delta f_a$ and $\Delta f_b$, the measurement of the rotational velocity is therefore given by the first simple equation:

$$\Omega = -(\Delta f_a + \Delta f_b)$$

whereas the measurement of the cavity length L is given by the second simple equation:

$$2c/L = \Delta f_a - \Delta f_b$$

By way of examples, a passive resonator gyro according to the invention has as main parameter values:

In the case of a first embodiment of the gyro using acousto-optical modulators:

Length of the cavity: L=3 m or else c/L=100 MHz;
Number of modes $N_1 = 2 \cdot 10^6$; $N_2 = N_1+1$ and $N_3 = N_1+2$ In the case of a second embodiment of the gyro using a phase modulator and optical filters and working in the same range of optical frequencies as the previous gyro:

Length of the cavity: L=30 cm or else c/L=1 GHz;
Number of modes $N_1 = 2 \cdot 10^5$; $N_2 = N_1+20$ and $N_3 = N_1-20$

The invention claimed is:

1. Passive resonator gyro comprising an injection laser emitting an initial optical beam at a first frequency and a cavity, Wherein the gyro includes:
an optical splitter configured to divide the initial optical beam into a first optical beam, into a second optical beam and into a third optical beam, the first beam being injected into the cavity in a first direction, the second and third optical beams being injected into the cavity in the opposite direction;

a first slaving device configured to slave the first frequency of the first optical beam to a first proper frequency corresponding to a first mode of resonance of the cavity or to slave a first proper frequency corresponding to a first mode of resonance of the cavity to the first frequency of the first optical beam;

a second slaving device configured to slave the second frequency of the second optical beam to a second proper frequency corresponding to a second mode of resonance of the cavity;

a third slaving device configured to slave the third frequency of the third optical beam to a third proper frequency corresponding to a third mode of resonance of the cavity, the three proper frequencies being all different from each other; and means for measuring a first frequency difference between the first frequency and the second frequency and for measuring a second difference between the second frequency and the third frequency, these two frequencies combined together being representative of the length of the cavity and the angular rotational velocity of the cavity along an axis perpendicular to the median plane of said cavity.

2. Passive resonator gyro according to claim 1, wherein the gyro includes a first photodetector arranged so as to receive the first optical beam after crossing the cavity and a second photodetector arranged so as to receive the second optical beam and the third optical beam after crossing the cavity in the opposite direction, the first signal output by the first photodetector being sent in the first slaving device and the second signal output by the second photodetector being sent in the second slaving device and the third slaving device.

3. Passive resonator gyro according to claim 2, wherein each of the second and third slaving devices includes at least:
a phase shifting means arranged at the output of the first photodetector or of the second photodetector;
an oscillator running at a predetermined oscillation frequency;
a mixer for mixing the signals output by the oscillator and by the phase shifting means;
a control loop delivering a frequency error signal based on the signal output by the mixer;
an adder for summing the signal output by the control loop and by the oscillator.

4. Passive resonator gyro according to claim 3, wherein the first slaving device includes a phase modulator having a predetermined modulation frequency.

5. Passive resonator gyro according to claim 3, wherein the second slaving device and the third slaving device each include an acousto-optical modulator configured to make frequency changes to the second frequency and the third frequency.

6. Passive resonator gyro according to claim 3, wherein the second slaving device and the third slaving device each include a phase modulator configured to make frequency changes to the second frequency and the third frequency by serrodyne modulation.

7. Passive resonator gyro according to claim 4, wherein the architecture of the first slaving device is a Pound Dreyer Hall architecture.

8. Passive resonator gyro according to claim 1, wherein the first slaving device, the second slaving device and the third slaving device include a control loop that is a proportional, integral, derivative (PID) control loop.

9. Passive resonator gyro according to claim 1, wherein the cavity is a fibre optic cavity.

10. Passive resonator gyro according to claim 9, wherein the cavity is a hollow-core photonic crystal fibre cavity.

11. Passive resonator gyro according to claim 9, wherein the length of the fibre optic cavity is between a few tens of centimeters and a few meters.

12. Passive resonator gyro according to claim 1, wherein the cavity is composed of an integrated optics waveguide.

13. Passive resonator gyro according to claim 1, wherein the cavity is a device made with integrated optics.

14. Passive resonator gyro according to claim 1, wherein, when the angular rotational velocity of the gyro is zero, the first frequency, the second frequency and the third frequency are integer multiples of the base frequency equal to the speed of light divided by the length of the cavity and the first frequency difference and the second frequency difference are at least equal to said base frequency.

15. A method for operating a passive resonator gyro comprising an injection laser emitting an initial optical beam at a first frequency and a cavity, comprising:
using an optical splitter to divide the initial optical beam into a first, second, and third optical beams;
injecting the first beam being into the cavity in a first direction and injecting the second and third optical beams into the cavity in a second direction opposite direction the first direction;
using a first slaving device to slave the first frequency of the first optical beam to a first proper frequency corresponding to a first mode of resonance of the cavity or to slave a first proper frequency corresponding to a first mode of resonance of the cavity to the first frequency of the first optical beam;
using a second slaving device to slave a second frequency of the second optical beam to a second proper frequency corresponding to a second mode of resonance of the cavity;
using a third slaving device to slave a third frequency of the third optical beam to a third proper frequency corresponding to a third mode of resonance of the cavity, the first, second and third proper frequencies being all different from each other; and
determining a length of the cavity and an angular rotational velocity of the cavity along an axis perpendicular to the median plane of the cavity based on a first frequency difference between the first frequency and the second frequency and a second difference between the second frequency and the third frequency.

16. The method of claim 15, further comprising:
using a first photodetector arranged with the gyro to receive the first optical beam after crossing the cavity in the first direction and a second photodetector to receive the second optical beam and the third optical beam after crossing the cavity in the second direction; and
generating a first output signal at an output of the first photodetector, the first output signal being sent to the first slaving device and the second signal output by the second photodetector being sent to the second slaving device and the third slaving device.

17. The method of claim 16, wherein each of the second and third slaving device is configured to:
phase shift the output of the first photodetector and the output of the second photodetector;
run an oscillator to generate an output at a predetermined oscillation frequency;

mix the signals output by the oscillator and the phase shifted output;

generate a frequency error signal based on the mixed signal output; and add the frequency error signal and the oscillator output signal.

18. The method of claim 17 wherein using the first slaving device comprises using a phase modulator having a predetermined modulation frequency.

19. The method of claim 17 wherein using the second slaving device and the third slaving device comprises using a first and second acousto-optical modulators, respectively, to make frequency changes to the second frequency and the third frequency, respectively.

20. The method of claim 17, wherein using the second slaving device and the third slaving device comprises using first and second phase modulators, respectively, to make frequency changes to the second frequency and the third frequency by serrodyne modulation.

* * * * *